United States Patent [19]
Tarsha

[11] 3,863,676
[45] Feb. 4, 1975

[54] PISTON TYPE ACCUMULATOR
[75] Inventor: Manuel A. Tarsha, Santa Ana, Calif.
[73] Assignee: Parker-Hannifin Corporation, Cleveland, Ohio
[22] Filed: Apr. 23, 1973
[21] Appl. No.: 353,763

[52] U.S. Cl. ............................................... 138/31
[51] Int. Cl. .......................................... F16l 55/04
[58] Field of Search ............ 138/31; 73/392; 92/65, 92/51, 52

[56] References Cited
UNITED STATES PATENTS
2,688,984  9/1954  Snyder ............................... 138/31
2,764,998  10/1956  McCuistion ......................... 138/31
3,100,001  8/1963  Forwald ............................. 92/65 X Primary Examiner—Charles A. Ruehl
Attorney, Agent, or Firm—John N. Wolfram

[57] ABSTRACT

A piston type gas-liquid accumulator wherein a maximum of displaceable fluid volume is attained by providing an auxiliary piston within a hollow main piston, the auxiliary piston being mounted on a rod in the main piston and movable from one end of the main piston to the other for alternately displacing gas and liquid from the hollow main piston.

11 Claims, 3 Drawing Figures

PISTON TYPE ACCUMULATOR

BACKGROUND OF THE INVENTION

Piston type accumulators have a piston within a cylinder that divides the cylinder into two chambers, one for gas and the other for liquid. The piston is movable in response to differentials of the gas and liquid pressure acting thereon for increasing and decreasing the volume of each chamber, depending upon the direction of piston movement.

To prevent the piston from cocking and sticking, it must have substantial length to provide adequate axial spacing of its bearing contact with the wall of the cylinder. In prior accumulators with only one piston, the entire volume defined by the lenth and diameter of the piston is dead space, that is, fluid is not displaced therefrom and therefore the overall volume of the cylinder must be great enough to accommodate this dead space as well as the required volume from which fluid can be displaced. The latter is sometimes referred to as the swept volume. Obviously, the length and/or diameter of the accumulator can be reduced if the dead space is reduced or eliminated. This is an important consideration in many installations, such as aircraft and space vehicles, where space is at a premium.

SUMMARY OF THE INVENTION

The present invention provides of an accumulator with a main piston of substantial depth for sufficient spacing of its hearing contact but minimizes the dead space taken up by the piston by providing an auxiliary piston within the main piston to alternately displace gas and liquid therefrom. The auxiliary piston is slidably mounted on a small diameter central rod carried by the main piston whereby its axial bearing support is the rod, and hence the axial length of the auxiliary piston is much shorter than the axial bearing support and the axial length of the main piston, the length of the axial bearing support in each case being sufficient to keep such piston from cocking and sticking.

DETAILED DESCRIPTION

Figure 1:
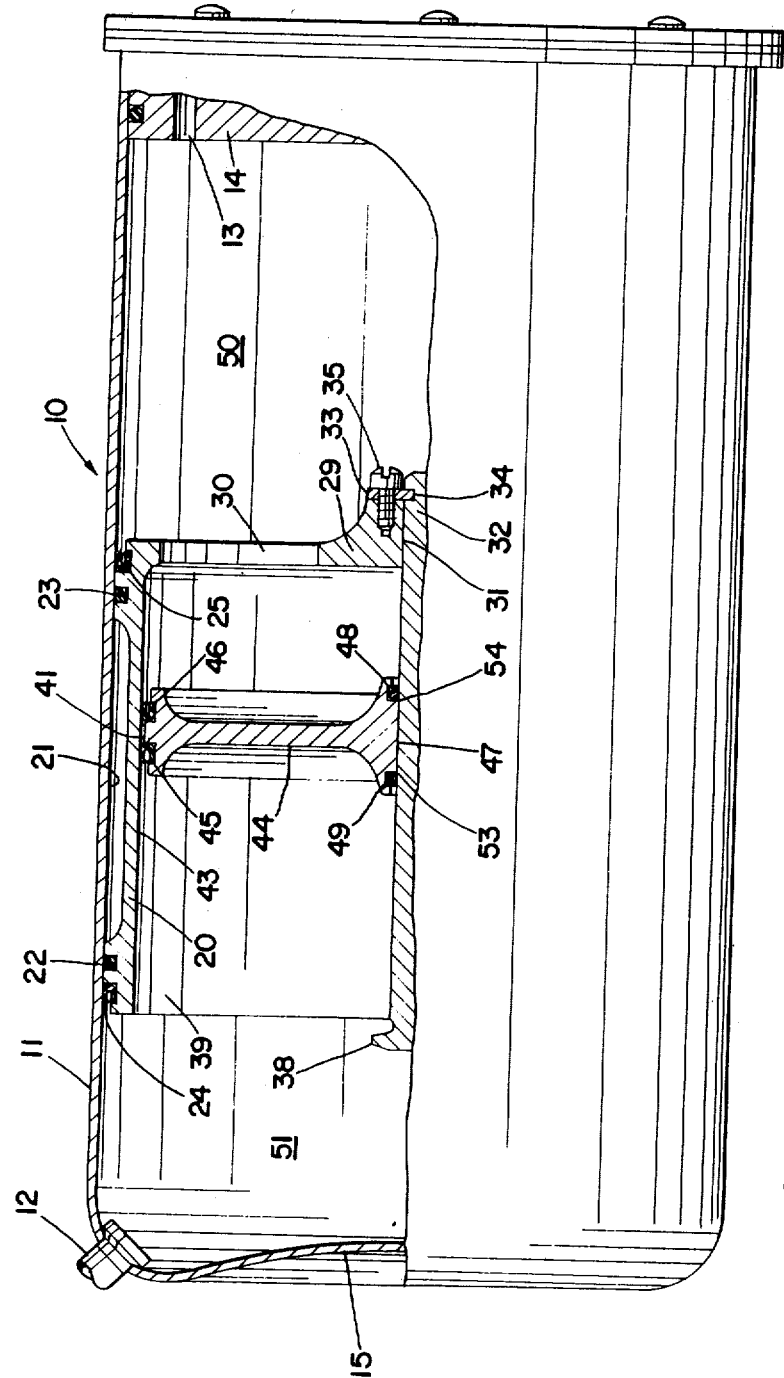
FIG. 1 is a view partly in longitudinal cross section.

In the particular embodiment of the invention illustrated in the drawing, accumulator 10 includes a cylindrical shell 11 having a gas inlet port 12 at one end and a port 13 at the other end for communication with a hydraulic or other liquid system. The cylinder is closed at both ends, as by the end cap 14 at one end by an integral end wall 15 at the other end.

A main piston 20 is in sliding engagement with the cylindrical wall 21 via plastic bearing rings 22, 23 mounted in grooves on the piston and which are axially spaced a substantial distance so that the main piston will not cock and stick but will be freely slidably along wall 21. The main piston is sealed relative to wall 21 by suitably packing rings 24, 25.

The main piston 20 has a transverse portion 29 at one end that has a series of openings 30 therethrough and has a central opening 31 in which an axially extending cylindrical rod 32 is mounted and secured in position by a split ring 33 projecting into a groove 34 and clamped against transverse portion 29 by bolts 35. Rod 32 extends to the other end of main piston 20 and has a stop flange 38. The other end of the main piston is open as at 39 and the main piston is hollow with an inner cylindrical surface 43.

Mounted within the main piston is an auxiliary piston 44 slidable within inner cylindrical surface 43 of the main piston and sealed relative thereto by packings 45, 46. Piston 44 has a central opening 47 whose wall is in slidable bearing contact with rod 32 and sealed relative to the latter by packings 48, 49. The two pistons 20, 44 cooperate to divide the interior of cylinder 11 into a chamber 50 for liquid and a chamber 51 for gas.

Figure 2:
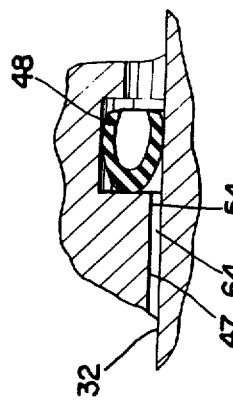
FIG. 2 is an enlarged fragmentary cross section view showing the fit between the auxiliary and main pistons.
Figure 3:
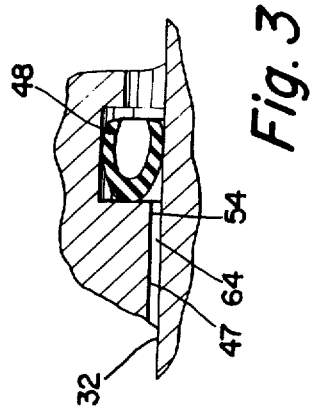
FIG. 3 is an enlarged cross section view showing the fit between the auxiliary piston and its mounting rod.

The axial length of the bearing contact between auxiliary piston surface 47 and rod 32 can be much shorter than the axial distance between main piston bearings 22, 23, as shown, primarily because rod 32 is of much small diameter than surface 21. Sticking of either piston occurs when its tilt angle exceeds the angle of friction of the bearing materials. Given the same radial clearance between rod 32 and bearing wall 47 as between bearing 22, 23 and surface 21, and the same angular tilt that can be imparted to the two pistons before the spaced edges 53, 54 of bearing surface 47 contact rod 32 on diametrically opposite points and bearings 22, 23 contact surface 21 on diametrically opposed points the axial spacing of edges 53, 54 will be much less than that of bearings 22, 23. Thus the axial length of auxiliary piston 44 can be much shorter than main piston 20 with the same tilt angle at which diametrically opposite contact of the respective bearings occurs. To insure that surface 47 provides the effective bearing support surface for piston 44, there is greater radial clearance 61 between this piston's outer surface 41 and surface 43 than between surface 47 and rod 32 at 64. Moreover, the clearance 61 is great enough to avoid contact between surfaces 41 and 43 even when the auxiliary piston is tilted the maximum amount permitted by bearing portions 53, 54. See FIGS. 2 and 3.

OPERATION

Normally, chamber 51 is first charged with gas through port 12 to a predetermined pressure and port 12 is then closed. This gas precharge moves main piston 20 against end cap 14 and also causes auxiliary piston 44 to move to the right against transverse portion 29 of the main piston.

Upon introduction of liquid into chamber 50 via port 13 under pressure higher than the gas pressure, either or both the main and auxiliary pistons will move to the left until the gas and liquid pressure are substantially equalized. It is immaterial whether the auxiliary piston or the main piston moves first in either direction or whether they both move at the same time. These relative movements are mainly dependent upon the friction of packings 45, 46 against surface 43 and packings 48, 49 against rod 32 as compared with the friction of packings, 24, 25 and bearings 22, 23 with surface 21. In any case, as auxiliary piston 44 moves within the main piston it alternately displaces gas and liquid therefrom.

Assume that the friction of the main piston against surface 21 is less than the friction on the auxiliary piston, and that piston 44 is against transverse portion 29 when hydraulic fluid is introduced into chamber 50. If the hydraulic pressure is higher than the gas pressure, the main piston 20 will move to the left. If the hydraulic pressure is high enough, the main piston will move to the left until it stops because of abutment of rod 32 against cylinder end 15. At this time, auxiliary piston 44 will move to the left until it butts against stop flange 38.

As auxiliary piston 44 moves to the left within the main piston, it will displace gas from the interior of the main piston into chamber 51 while at the same time hydraulic fluid from chamber 50 passes through openings 30 into the interior of the main piston.

Upon a subsequent drop in the pressure of liquid in chamber 50 below the gas pressure in chamber 51, the differential in such pressure will cause main piston 20 to move to the right. Again, auxiliary piston 44 will not move relative to the main piston until the latter is stopped by engagement with end cap 14. When the latter occurs, and assuming that the liquid pressure is still lower than the gas pressure, auxiliary piston 44 will move to the right within the main piston until either the gas and liquid pressures become substantially balanced or until piston 44 butts against transverse portion 29 of the main piston. As the auxiliary piston thus moves to the right within the main piston, it displaces liquid from within the main piston through openings 30 into chamber 50 and permit gas from chamber 51 to enter piston 20.

From the above, it is apparent that auxiliary piston 44 acts to alternately sweep gas and liquid from the interior of the main piston so that a substantial portion of the volume of the interior of piston 20 is utilized in the functioning of the accumulator and is not wasted. With this being the case, the overall size and volume of the accumulator can be smaller to provide the same total swept volume than an accumulator in which auxiliary piston 44 is not provided and the interior of the main piston 20 is unswept.

I claim:

1. An accumulator comprising a cylinder closed at both ends and having an inner cylindrical surface, a main piston slidable in the cylinder in sealed engagement with said surface, said main piston having a bore forming a piston chamber open at each end to the interior of the cylinder, an axially extending cylindrical member mounted in the main piston, and an auxiliary piston slidably mounted on the member and in sealed engagement at its outer periphery with said bore.

2. The accumulator of claim 1 in which the main piston has axially spaced bearing portions engageable with said surface and said auxiliary piston has axially spaced bearing portions engageable with said member, the axial spacing of the main piston bearing portions being greater than that of the auxiliary piston.

3. The accumulator of claim 1 in which the auxiliary piston is sealed relative to said member.

4. The accumulator of claim 1 in which said member carries a stop means at one end for limiting travel of said auxiliary piston within said main piston.

5. The accumulator of claim 1 in which there is a means for limiting the travel of the auxiliary piston in the main piston in each direction.

6. The accumulator of claim 1 in which said main piston has a transverse portion at one end thereof upon which said member is mounted, and said transverse portion provides a stop for travel of the auxiliary piston in one direction.

7. The accumulator of claim 1 in which the auxiliary piston has a small radial clearance with said member and in which the auxiliary piston carries sealing means at its outer periphery for making sealing contact with said bore, and said periphery otherwise has a radial clearance with said bore that is greater than said small radial clearance.

8. The accumulator of claim 1 in which said auxiliary piston has a peripheral portion having a close radial clearance with said bore and has a central opening that receives said member with a close radial clearance, said central opening being of greater axial length than said peripheral portion.

9. An accumulator comprising a cylinder closed at both ends, an elongated main piston slidable in the cylinder in sealed engagement therewith, said main piston having an elongated piston chamber having substantially unrestricted communication at each end with the interior of the cylinder, an auxiliary piston mounted for slidable axial movement in said piston chamber and in sealed engagement with said main piston whereby said pistons cooperate for dividing the cylinder into a chamber for gas and a single chamber for liquid.

10. An accumulator comprising a cylinder closed at its ends, an elongated main piston in said cylinder having axially spaced bearing surfaces in sliding contact with said cylinder, means sealing said main piston relative to said cylinder, said main piston having an elongated inner cylindrical surface, an auxiliary piston within said main piston and in free floating sealed sliding engagement with said inner cylindrical surface and of shorter axial length than said main piston for movement from one end of said cylindrical surface to the other end, said pistons cooperating to divide the cylinder into two chambers, one on each side of said pistons with each chamber being in substantially unrestricted communication with an adjacent side of the auxiliary piston, and means at each end of said main piston for retaining said auxiliary piston within said main piston.

11. An accumulator comprising a cylinder closed at its ends, an elongated main piston in said cylinder having axially spaced bearing surfaces in sliding contact with said cylinder, means sealing said main piston relative to said cylinder, said main piston having an elongated inner cylindrical surface, an auxiliary piston within said main piston and in sealed sliding engagement with said inner cylindrical surface and of shorter axial length than said main piston for movement from one end of said cylindrical surface to the other end, said pistons cooperating to divide the cylinder into two chambers, one on each side of said pistons with each chamber being in communication with an adjacent side of the auxiliary piston, means at each end of said piston for retaining said auxiliary piston within said main piston, one of said chambers being for liquid and the other for gas, and said main piston has a transverse support member at the end of the main piston that is adjacent the chamber for liquid, said support member carrying an axially extending member, and said auxiliary piston having an opening therethrough that receives said axially extending member and is in sealed sliding engagement therewith.

* * * * *